United States Patent Office 2,937,174
Patented May 17, 1960

2,937,174

PYRIMIDINONE SYNTHESIS

William F. Tousignant, Midland, Mich., assignor to The Dow Chemical Company, Midland, Mich., a corporation of Delaware No Drawing. Application September 25, 1957
Serial No. 686,049

4 Claims. (Cl. 260—251)

This invention relates to processes for the preparation of tetrahydro-5-hydroxy-2(1H)-pyrimidinone.

According to the invention, tetrahydro - 5 - hydroxy-2(1H)-pyrimidinone is prepared by the reaction of 1,3-diamino-2-propanol with a 1-amino-2-alkyl carbamate:

$H_2N-COO-CHR-CH_2-NH_2 + H_2N-CH_2-CHOH-CH_2-NH_2 \longrightarrow$

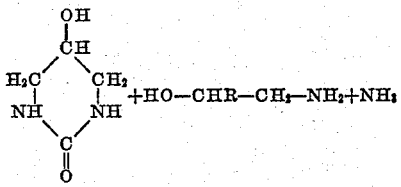

$+HO-CHR-CH_2-NH_2+NH_3$ wherein R is hydrogen or a lower alkyl group.

As is indicated in the above equation, 2-aminoalkanols are a valuable second product of the process of the invention, particularly since these are obtained free of any contaminating secondary and tertiary amines.

According to the invention, 1,3-diamino-2-propanol and a 1-amino-2-alkyl carbamate are heated together at a temperature of about 140 to 250° C., preferably about 175 to 210°. Ordinarily, several hours are required for maximum conversions, although substantial reaction occurs in a much shorter time. No substantial improvement in conversion is achieved by excessively long periods of heating, the optimum time usually being in the range of 4–10 hours.

Carbamates suitable for use in the invention are the 1-amino-2-alkyl carbamates which may or may not have a lower alkyl substituent in the 2-position. By "lower alkyl" we mean an alkyl group containing 1 to about 4 carbon atoms. They thus include the carbamic esters of ethanolamine, 1-amino-2-propanol, 1-amino-2-butanol, 1-amino-2-pentanols and 1-amino-2-hexanols.

While the process of the invention can be carried out in an inert organic solvent, a solvent is unnecessary and, in general, undesirable. In a preferred embodiment, the two reactants are mixed in substantially equimolecular proportions and heated, either batchwise in a suitable kettle or continuously in a long tubular reactor through which the mixture is pumped. In either case, the reaction product solidifies upon being cooled and can then be purified, if necessary, by being washed with a suitable liquid or recrystallized from an inert solvent.

The practice of the invention is illustrated by the following examples.

*General procedure.*—One gram-mole each of 1,3-diamino-2-propanol and a 1-amino-2-alkyl carbamate were placed in a pressure reactor and heated 9 hr. at about 180° C., with continuous agitation. There was an autogenous pressure rise due to the liberation of ammonia. At the end of the reaction period the reactor was cooled, the ammonia was vented, the reactor was opened and the solid, crystalline mass was removed. The crude product was washed twice by being vigorously stirred with 500 ml. portions of ethanol and recovered by filtration. It could be further purified by recrystallization from hot aqueous alcohol or other suitable solvent.

The 2-aminoalkanol by-product was recovered from the ethanol washings by distillation under reduced pressure.

The results of several typical experiments are shown in the following table.

*Table I.—Preparation of pyrimidinones*

| Carbamate Used | Yield, Percent of Theory | |
|---|---|---|
| | Pyrimidinone | Alkanolamine |
| 1-amino-2-ethyl | 59 | 58 |
| 1-amino-2-ethyl a | 55 | |
| 1-amino-2-propyl | 58 | 16 |
| 1-amino-2-butyl | 70 | 38 | a This experiment duplicated the first except that the reaction was run in an open kettle at atmospheric pressure.

Results substantially equivalent to those shown in the above table are obtained when the reaction is conducted at other temperatures in the range of about 175–210°, somewhat poorer results being obtained at lower temperatures down to 140° and at higher temperatures up to about 250°. The optimum reaction time varied inversely with the temperature but was in the range of about 4–10 hr. in all experiments run batchwise. Other things being equal, the optimum time of reaction in continuous-flow reactors is somewhat less than in batch reactors.

I claim:

1. A process for producing tetrahydro - 5 - hydroxy-2(1H)-pyrimidinone comprising heating at about 140 to 250° C. a mixture of 1,3-diamino-2-propanol and a 1-amino-2-alkyl carbamate having the formula $$H_2NCOOCHRCH_2NH_2$$

wherein R is a radical selected from the group consisting of hydrogen and lower alkyl groups.

2. A process as defined in claim 1 wherein R is hydrogen.

3. A process as defined in claim 1 wherein R is a methyl radical.

4. A process as defined in claim 1 wherein R is an ethyl radical.

References Cited in the file of this patent

UNITED STATES PATENTS 2,517,750     Wilson ------------------ Aug. 8, 1950

FOREIGN PATENTS 603,160     Great Britain ------------ June 10, 1948